United States Patent
Jones

(10) Patent No.: US 10,479,439 B2
(45) Date of Patent: Nov. 19, 2019

(54) PUMP-ACTION RIDE-ALONG VEHICLE

(71) Applicant: Micheal D. Jones, Portland, OR (US)

(72) Inventor: Micheal D. Jones, Portland, OR (US)

(*) Notice: Subject to any disclaimer, the term of this patent is extended or adjusted under 35 U.S.C. 154(b) by 138 days.

(21) Appl. No.: 15/694,894

(22) Filed: Sep. 4, 2017

(65) Prior Publication Data

US 2018/0072372 A1 Mar. 15, 2018

Related U.S. Application Data

(60) Provisional application No. 62/385,860, filed on Sep. 9, 2016.

(51) Int. Cl.

| | |
|---|---|
| *B62M 1/28* | (2013.01) |
| *B62K 21/02* | (2006.01) |
| *B62M 9/08* | (2006.01) |
| *B62M 9/16* | (2006.01) |
| *B62M 21/00* | (2006.01) |
| *B62M 9/00* | (2006.01) |

(52) U.S. Cl.
CPC ............ *B62M 1/28* (2013.01); *B62K 21/02* (2013.01); *B62M 9/08* (2013.01); *B62M 9/16* (2013.01); *B62M 21/00* (2013.01); *B62M 2009/002* (2013.01)

(58) Field of Classification Search
CPC ......... B62M 1/28; B62M 9/007; B62K 3/005; B62J 13/00
See application file for complete search history.

(56) References Cited

U.S. PATENT DOCUMENTS

| | | | | |
|---|---|---|---|---|
| 3,759,543 | A | * | 9/1973 | Clark ........................ B62M 1/28 280/236 |
| 4,186,934 | A | * | 2/1980 | Collings ................... B62H 1/12 280/221 |
| 4,796,907 | A | * | 1/1989 | Geller ....................... B62M 1/14 280/220 |
| 4,861,055 | A | | 8/1989 | Jones |
| 4,925,200 | A | | 5/1990 | Jones |
| 5,829,772 | A | | 11/1998 | Jones |

(Continued)

OTHER PUBLICATIONS

Power Pumper Assembly Instruction Video, https://www.youtube.com/watch?v=5doWAH2u_ug, Apr. 14, 2015.

*Primary Examiner* — Joseph M Rocca
*Assistant Examiner* — Harold Eric Pahlck, III
(74) *Attorney, Agent, or Firm* — Craig R. Rogers; Simple IP Law, P.C.

(57) ABSTRACT

A ride-along vehicle may include a spring/chain guard that covers a spring and chain assembly and provides an attachment point for the spring. The guard may have a narrow portion that covers and helps retain the chain on a sprocket as well as a wider portion that covers the spring. In another embodiment, the spring can be connected to a fulcrum that has a chain retention pulley, gear, guide, or wheel that keeps the chain tight in loop to improve the pump-action operation of the vehicle. An improved pumper arm and steering mechanism may include a pivot joint that is provided by rods, pins, or bolts attached to opposite sides of the pumper arm. The universal joint between the steering arm and the pumper arm can be aligned with the center of the pivot point to prevent rocking of the steering arm as the pumper arm is actuated.

20 Claims, 9 Drawing Sheets

(56) References Cited

U.S. PATENT DOCUMENTS

| | | | | |
|---|---|---|---|---|
| 5,876,052 A * | 3/1999 | Olson | .................... | B62K 3/005 |
| | | | | 280/220 |
| 6,179,314 B1 | 1/2001 | Jones | | |
| 6,220,609 B1 | 4/2001 | Jones | | |
| 6,932,370 B2 | 8/2005 | Jones et al. | | |
| 7,216,878 B2 * | 5/2007 | Damon | .................... | B62K 9/02 |
| | | | | 280/93.51 |
| 8,985,607 B2 * | 3/2015 | Schminkey | .............. | B62M 1/16 |
| | | | | 280/245 |
| 2005/0087952 A1 * | 4/2005 | Drymalski | ............. | B62K 3/005 |
| | | | | 280/244 |
| 2005/0217914 A1 * | 10/2005 | Sugimoto | ............ | B62K 25/005 |
| | | | | 180/206.4 |
| 2009/0095115 A1 * | 4/2009 | Lee | ........................ | B62K 3/005 |
| | | | | 74/496 |
| 2009/0200768 A1 * | 8/2009 | Armand | ................. | B62K 3/002 |
| | | | | 280/221 |

* cited by examiner

400

400

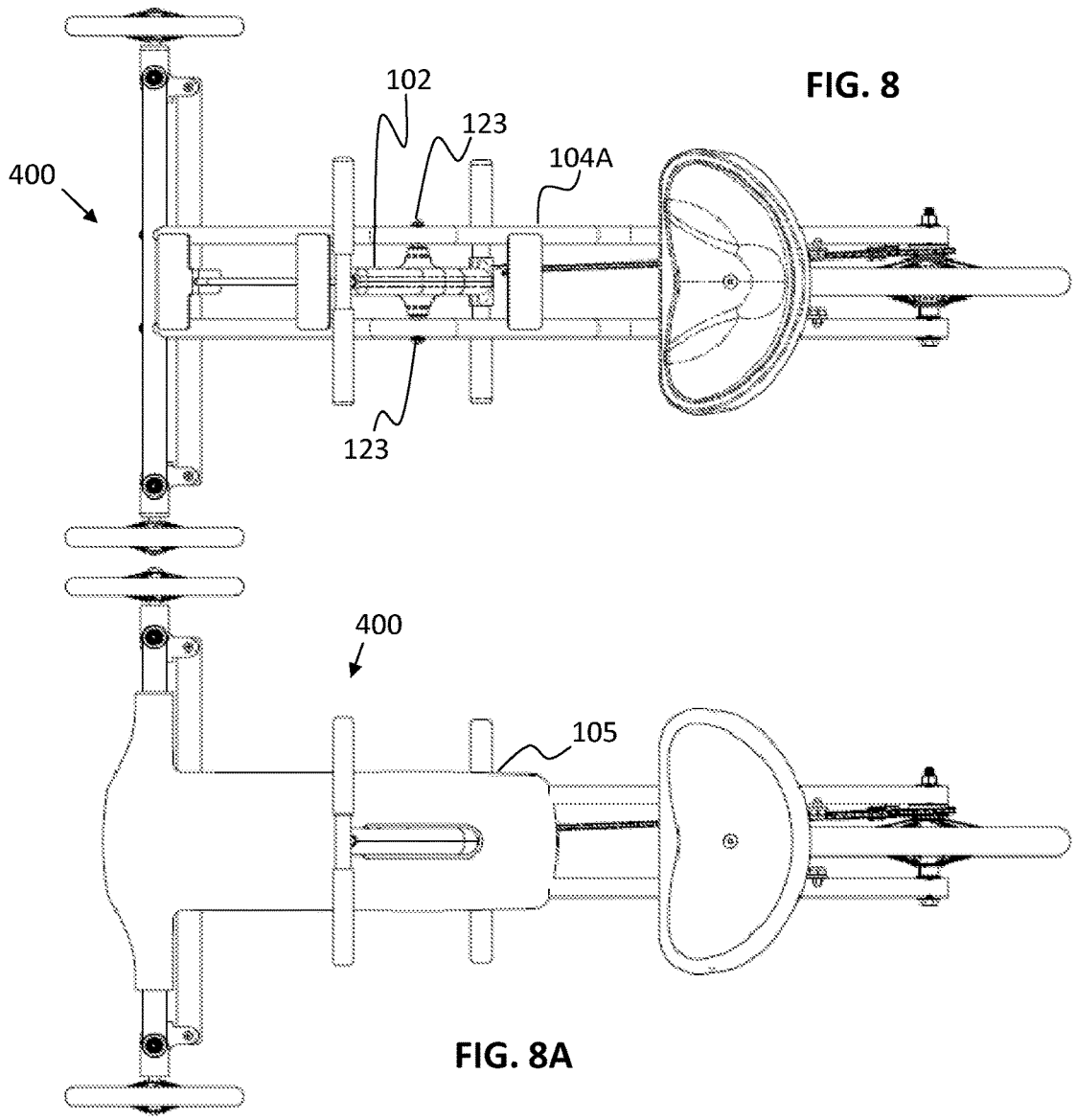

PUMP-ACTION RIDE-ALONG VEHICLE

PRIORITY CLAIM

This application is a non-provisional of, and claims priority from, U.S. Provisional Patent Application Ser. No. 62/385,860, filed Sep. 9, 2016, the contents of which are incorporated herein by reference in their entirety.

BACKGROUND OF THE INVENTION

Field of the Invention

This invention relates generally to ride-along vehicles such as children's ride-along toys. More particularly, this invention relates to a ride-along vehicle that is powered by a pumping action.

Related Art

Applicant is the owner of U.S. Pat. Nos. 5,829,772; 6,179,314; and 6,932,370, the contents of each of which are incorporated herein by reference in their entireties. The current application shows and describes numerous features and benefits that improve upon Applicant's earlier inventions.

SUMMARY OF THE INVENTION

According to various embodiments and principles of the present inventive concepts, a pump-action ride-along vehicle can be provided having numerous improvements over the related art. In particular, principles of the present inventive concepts provide an improved front end system and steering mechanism. A rotating steering swivel can be provided to connect the steering arm to the steering bar arranged between the wheels. The steering swivel can include a longitudinal slot permitting the steering arm to move forward and backward in the slot as the pumper arm is actuated. When the handle bar is turned, the steering swivel can rotate within a receptacle in the steering bar thereby reducing or eliminating any torque that would be applied to the steering bar by a more rigid connection.

A chain/spring guard and a pumper arm cover plate (or shroud) can further be provided to protect the chain and spring from unwanted snags or debris and to further prevent injury to a rider. For example, the guards and covers could help ensure that any clearances relative to a moving part are either greater than ½ inch or less than $\frac{1}{8}^{th}$ inch to prevent pinching of fingers or skin of an operator. The spring/chain guard could, for example, be a telescoping tube surrounding the spring and/or part of the chain. As the pumper arm moves, the tube could extend and retract to keep the spring and/or chain covered. Alternatively, the chain/spring guard could be a flexible, rubber, plastic, or cloth sleeve that covers the spring and/or chain.

In a preferred embodiment, the spring/chain guard is a cover plate that has a narrow end covering the sprocket and chain to help retain the chain on the sprocket. A wider portion can extend from the narrower portion and cover the connection between the chain and spring and the entire spring. One end of the spring could be connected to the chain coming from the sprocket and another end of the spring could be connected to an internal portion of the spring/chain guard. For instance, a bolt, clip or other fastening device could be used to secure an end of the spring to an end of the spring/chain guard.

The pumper arm cover plate could be a plate covering the opening between the pumper arm and the pumper car body. Alternatively, a shroud (rubber, plastic, or cloth, for example) could be placed around the pumper arm and cover the opening between the arm and the vehicle body.

An improved spring/chain routing system can also be provided to improve the pump-action operation of the vehicle. For example, a lever arm or fulcrum could be provided to connect one end of the spring to the chain to maintain tension on the chain without a direct connection between the spring and the chain. The other end of the spring could be connected to the vehicle body through a rigid connection. The chain could be routed around a wheel, chain guide, or gear arranged on one end of the fulcrum, with the other end (or other portion) of the fulcrum being pivotably connected to the body to permit the distal end of the fulcrum having the chain guide to move forward and back during operation of the pumper arm. More specifically, one end of the chain could be connected to a bottom end of the pumper arm, with the chain routed around the sprocket and around the chain guide, with an opposite end of the chain connected to the vehicle body near the sprocket. This design allows for a greater range of movement of the pumper arm without the need for a longer spring. This design therefore further permits much more efficient movement of the vehicle in response to the pumping action.

According to a still further aspect of the inventive concepts, an improved steering mechanism can be provided which reduces or eliminates the rocking motion of the steering arm. To accomplish this, a universal joint between the steering arm and the pumper arm could be aligned with a pumper arm pivot point. By aligning the universal joint with the pivot point, rocking of the steering arm in response to pumping of the arm can be reduced or eliminated.

Various additional aspects, embodiments, and configurations of the inventive concepts are possible without departing from the principles disclosed herein. The inventive concepts are therefore not limited to any of the particular aspects, embodiments, or configurations shown or described herein.

BRIEF DESCRIPTION OF DRAWINGS

The foregoing and additional objects, features, and advantages of the present inventive concepts will become more readily apparent from the following detailed description of preferred embodiments, included, for example in the attached documents and drawings, in which:

FIGS. 5 through 8A provide various views of the ride-along vehicle of FIGS. 4 and 4A, further illustrating components of the ride-along vehicle according to various embodiments;

DETAILED DESCRIPTION OF ILLUSTRATIVE EMBODIMENTS

Various features, benefits, and configurations incorporating the principles of the present inventive concepts in illustrative embodiments are shown and described in detail in the accompanying documents and drawings. Additional features, benefits and configurations will be readily apparent to those of ordinary skill in the art based on this disclosure and all such features, benefits and configurations are considered within the scope of the present invention. Various illustrative embodiments will now be described in connection with the accompanying drawings.

In a first embodiment shown in FIGS. 1-3A, various improvements can be provided to a ride-along pump-action vehicle 100. For instance, an improved front-end system can be provided.

Figure 1:
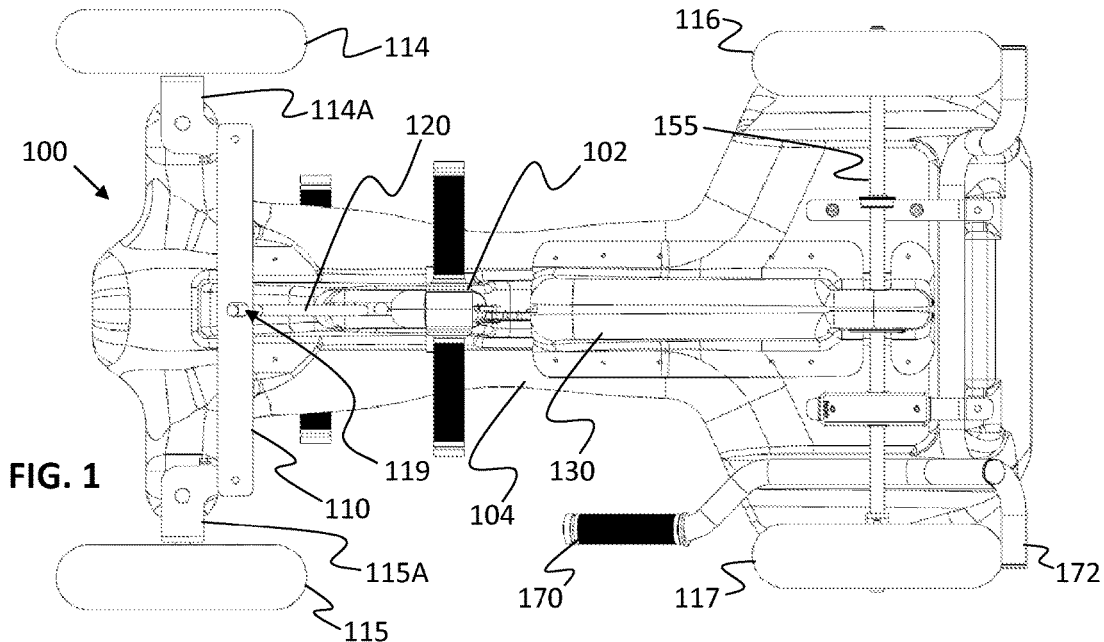
FIG. 1 is a bottom plan view of a ride-along vehicle according to one embodiment of the present inventive concepts.
Figure 1A:
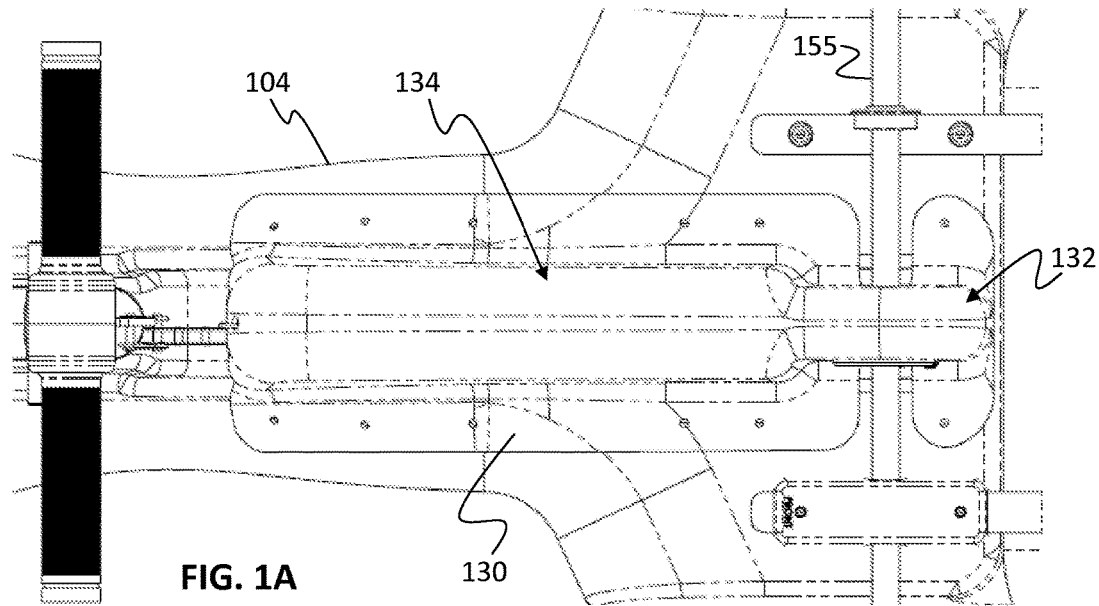
FIG. 1A is a close-up view of a spring/chain guard attached to the ride-along vehicle of FIG. 1.
Figure 2:
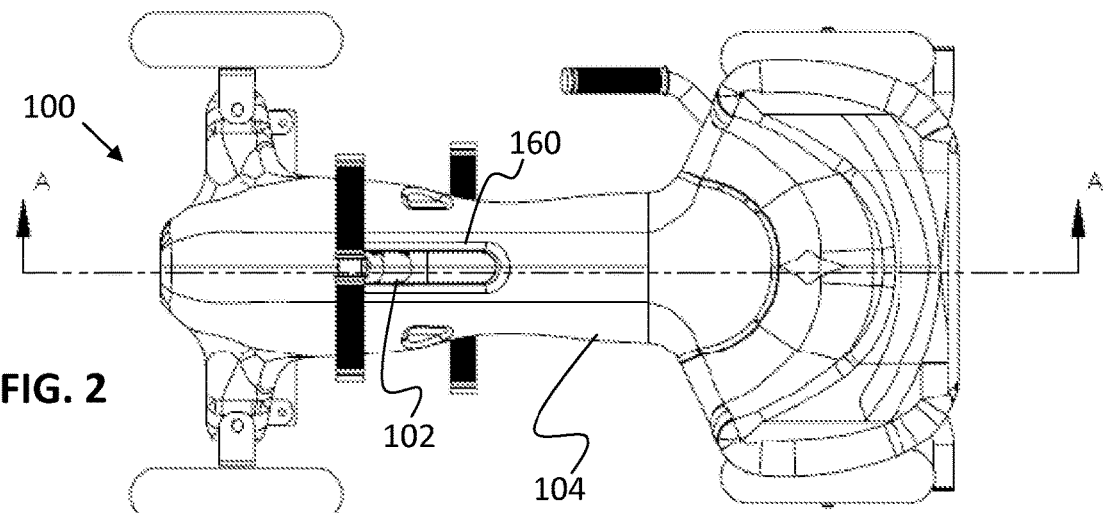
FIG. 2 is a top plan view of the ride-along vehicle of FIG. 1.
Figure 3:
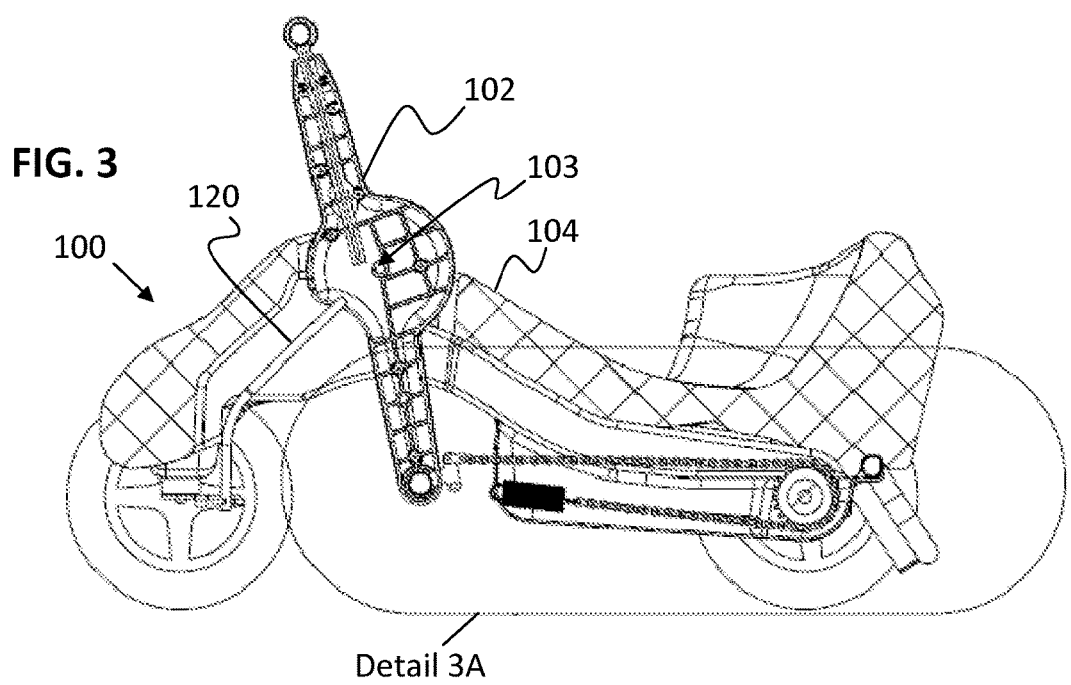
FIG. 3 is a cross-sectional side view of the ride-along vehicle of FIG. 2, taken along section A-A.
Figure 3A:
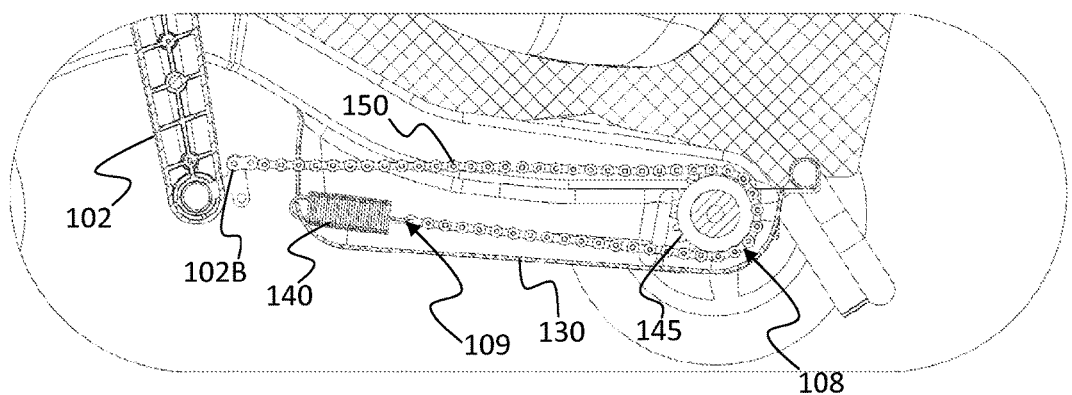
FIG. 3A is an enlarged view of Detail 3A of FIG. 3, further illustrating a spring/chain guard for the ride-along vehicle of FIG. 1, shown having a spring/chain assembly arranged therein according to an aspect of the present inventive concepts.
Figure 4:
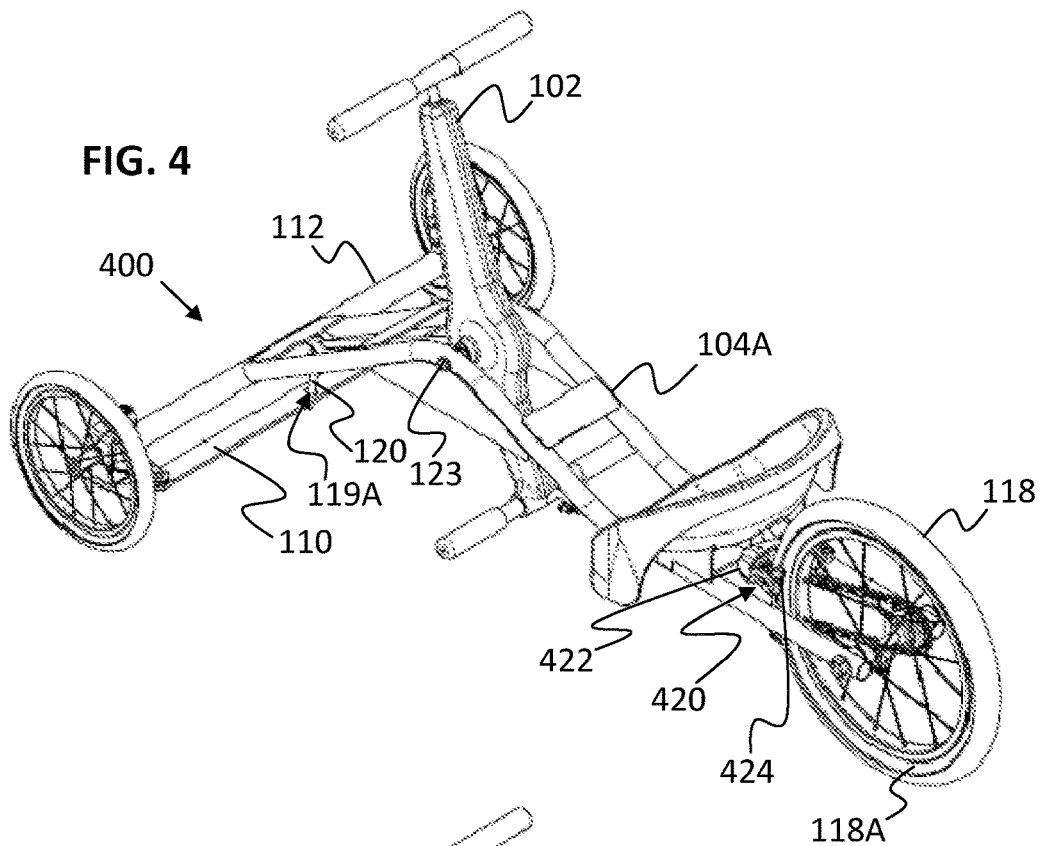
FIGS. 4 and 4A are somewhat schematic top perspective views of a ride-along vehicle according to an additional embodiment of the present inventive concepts, shown with a shroud removed and in place, respectively.
Figure 4A:
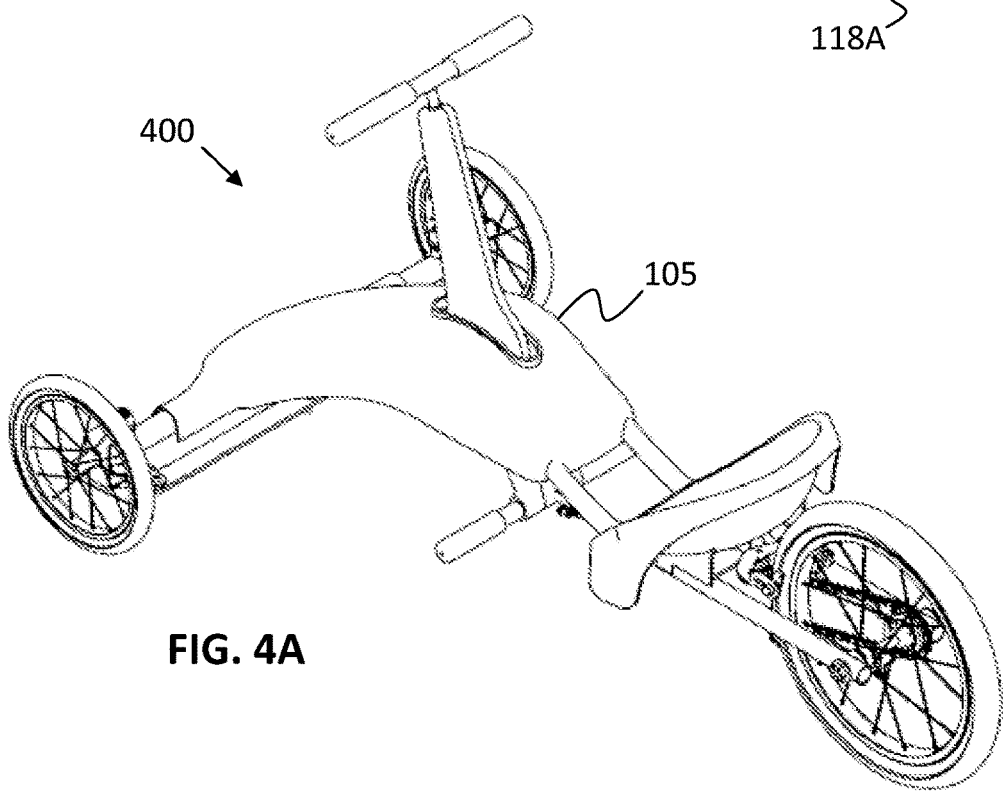
Figure 5:
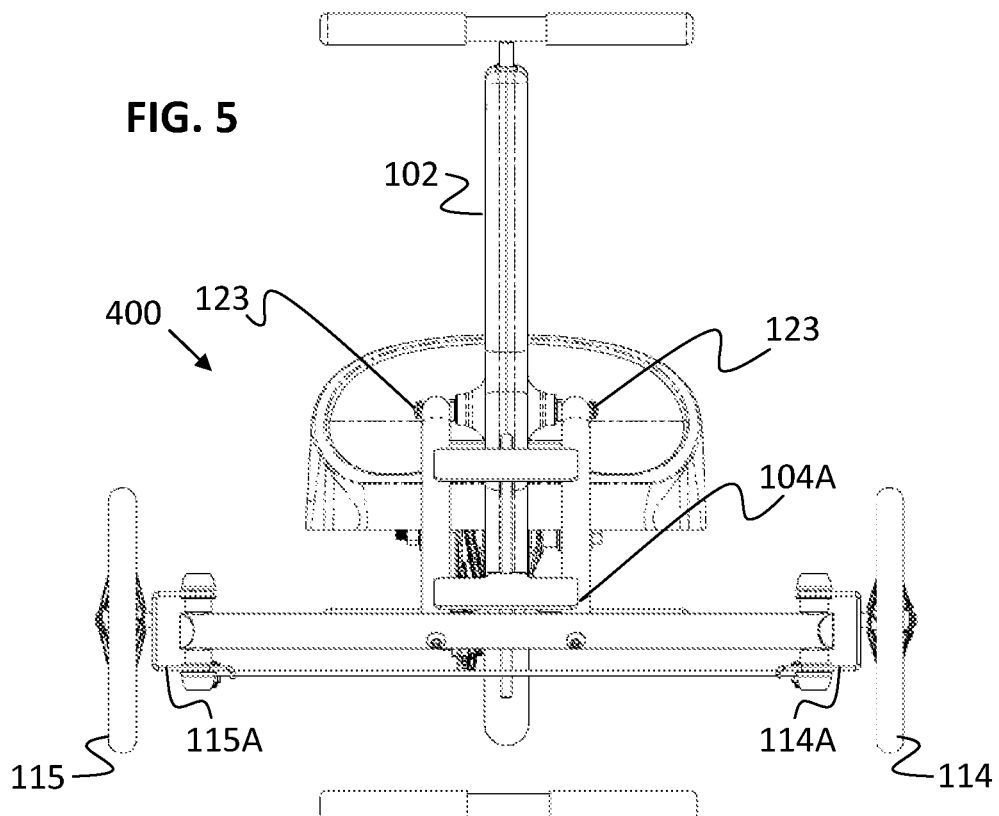
Figure 5A:
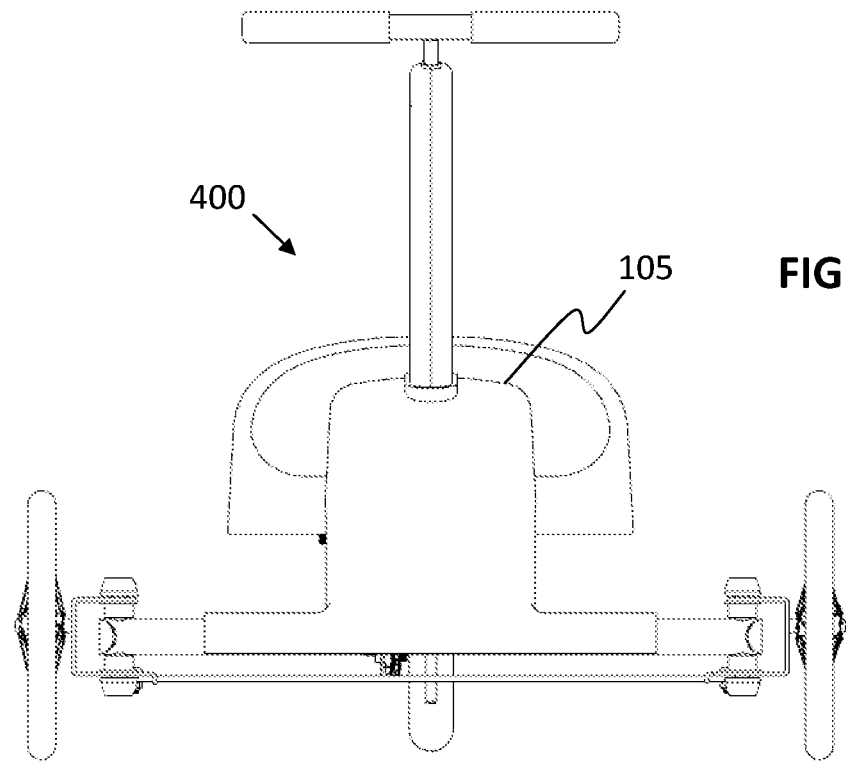

Referring first to FIG. 1, improvements to the front-end system may include, for instance a steering bar 110. The steering bar 110 may be provided in conjunction with a stabilizing bar 112 (see FIG. 4), each of which is arranged between opposite front wheels 114, 115 of the ride along vehicle. In some embodiments, the stabilizing bar 112 may be omitted entirely. The steering bar 110 can be configured to receive a steering arm 120 within a longitudinal slot 119 provided therein. The steering bar 110 may, for instance, comprise a one-piece arm, plate, or bar that extends between two front wheel mounts 114A, 115A and has a slot 119 arranged in the middle to receive the steering arm 120 therethrough.

A steering swivel (not shown) also having a longitudinal slot arranged therein may be mounted on the steering bar 110 in a way that permits the swivel to pivot back and forth around a longitudinal axis thereof. The slot in the swivel should also be arranged to receive an end of the steering arm 120 therein such that the end of the steering arm 120 can move forward and back within the slot as the pumper arm 102 is operated. A swivel connection between the steering arm 120 and the steering bar 110 can permit the swivel to rotate in response to turning of the steering arm 120 to relieve or eliminate torque stresses that could otherwise occur. By providing a longitudinal slot in the steering swivel that receives the steering arm 120, and by permitting rotational movement of the swivel about its longitudinal axis, these torque stresses can be substantially eliminated.

Referring additionally now to FIGS. 1A through 3A, in addition to the improved front-end system, a spring/chain guard 130 can be provided to both help prevent damage to the spring/chain system and also to further help prevent possible injury to a rider of the vehicle 100.

Various configurations of spring and chain guards could be provided, including, for example a tube/sleeve that slides over spring and chain assembly, a guard plate, or other cover. For example, a cloth, metal, or plastic tube could be provided that covers the spring and at least a portion of the chain assembly. A telescoping tube could be provided around the spring and a portion of the chain that can expand/shrink as the pumper arm is operated.

In the embodiment shown in FIGS. 1-3A, a molded plastic or metal spring/chain guard 130 can be formed and attached to a bottom of the pumper car body 104. The molded guard plate 130 preferably includes a narrow covering portion 132 that covers the chain and sprocket connection 108 and helps to hold the chain 150 on the sprocket 145. A wider covering portion 134 of the guard plate 130 can surround the connection 109 between the spring and chain as well as a majority, or the entirety, of the spring 140.

In the embodiment shown, one end of the chain 150 connects to a connecting point 102B on the lower end of the pumper arm 102. One end of the spring 140 attaches to a forward, inside wall of the guard plate 130. The other end of the spring 140 attaches directly to the chain 150 (also inside the guard). More specifically, the spring/chain guard 130 of this embodiment comprises a cover plate that has a narrow end 132 covering the sprocket 145 and chain 150 to help retain the chain 145 on the sprocket 150. A wider portion 134 extends from the narrower portion 132 and covers the connection 109 between the chain 150 and spring 140 and may also cover the entire (or at least a substantial portion of the) spring 140. One end of the spring 140 is connected to the chain 150 coming from the sprocket 145 and another end of the spring 140 is connected to the spring/chain guard 130. For instance, a bolt, clip or other fastening device (not shown) could be used to secure an end of the spring 140 to a front end of the chain/spring guard 130.

Alternatively, the spring 140 could extend through the guard plate 130 and attach, along with the chain, to a lower end of the pumper arm 102. In this case, however, a tube or cloth covering (not shown) should be provided to cover the portion of the spring 140 that extends beyond the guard plate 130.

Also, in some embodiments, rather than provide a narrower and wider covering portion of the guard plate 130, the guard plate 130 could have a covering portion that has substantially the same width along its entire length. In this embodiment, however, a separate plastic or metal retainer/chain guide (not shown) should be provided to hold the chain 150 in line with the sprocket 145.

A further safety plate or shroud 160 could also be included to cover a top connection between the pumper arm 102 and the body 104. This safety plate or shroud 160 is preferably configured to leave a gap between the body 104 and the moving arm 102 that is less than $\frac{1}{8}^{th}$ inch. In general, all gaps between stationary and moving parts should be less than $\frac{1}{8}^{th}$ inch or more than $\frac{1}{2}$ inch to prevent pinching of fingers or skin. In one embodiment, a metal or plastic safety plate 160 is attached over the opening in the body 104 where the pumper arm 102 extends to reduce the open gap between the moving and stationary parts. In another embodiment, a rubber, plastic, cloth, or other shroud (not shown) can be provided over (or around) the pumper arm 102 to cover the opening in the body 104 through which the pumper arm 102 extends. This type of configuration can satisfy safety regulations requiring either more than a $\frac{1}{2}$ inch clearance or less than a $\frac{1}{8}^{th}$ inch clearance at any connection point between moving parts.

Referring now to FIGS. 4-10, another embodiment of a ride-along, pump-action vehicle 400 is illustrated to show additional principles of the inventive concepts. Although some elements may be similar to the embodiment shown previously, various modifications may be made. Like elements are referred to by like reference numerals, throughout.

A ride-along vehicle 400 according to additional inventive principles could, for example, be provided with a modular structure such that it can be readily configured in either a two, three, or four-wheel version by the manufacturer, the retailer, and/or the end user. The body 104A may be a frame-like metal or plastic structure rather than a molded plastic body. A molded plastic shroud 105 may be provided to cover the frame 104A.

To provide a modular structure, for example, the single rear wheel 118 shown in this embodiment could be replaced by a two-wheeled structure, similar to that of the first embodiment. For instance, as in FIG. 1, an axle 155 could be provided having a wheel 116, 117 mounted on each of opposite ends of the axle 155, with a sprocket 145 arranged on the axle 155 in the same position with respect to the frame 104A as in the single-wheel version. Bearings 157 can be provided at the mounting points between the axle 155 and the vehicle 400. To connect the axle 155 to the vehicle 400, the bearings 157 or axle mount could slide up into position in receptacles 158 on the frame 104A, and could then be attached to frame 104A.

In the three-wheel version illustrated, the axle 155, having the sprocket 145 arranged thereon, slides up into position in the receptacles 158 arranged on the frame 104A, and nuts 159 are attached to ends of sprocket bolts 156 on each side of the sprocket 145 to secure the sprocket 145 to the frame 104A. In a two-wheel version, the two wheels 114, 115 at the front of the vehicle 400 can be replaced with a fork (not shown) that attaches to front bolts on the frame 104A, and a steering arm 120 can be provided that extends from the fork to steering a pin (not shown).

An improved pivot pin 103A and universal joint 124 connection can also be provided to improve the connection between the pumper arm 102 and the vehicle 400 and improve the overall steering mechanism. In some embodiments, the universal joint 124 connecting the steering arm 120 to the steering mechanism 102A of the pumper arm 102 must be offset from a direct center of the pumper arm 102 pivot point 103 because a rod or pin (not shown) is arranged directly through a center of the pivot point 103 in the pumper arm 102. Accordingly, in such embodiments, the universal joint 124 for the steering arm 120 needs to be offset from the center of the pivot point 103 so as not to interfere with the pivoting motion of the pumper arm 102. This arrangement results in forward and backward movement of the steering arm 120 as the pumper arm 102 moves back and forth.

In the improved embodiment illustrated in FIGS. 4-10, however, there is no pivot pin arranged all the way through the pumper arm 102. Rather, the pumper arm 102 is instead pivotably connected to the frame 104A through multiple rods, pins 103A, and/or bolts 123 each attached to only one side of the pumper arm 102. The universal joint 124 between the steering arm 120 and the pumper arm steering rod 102A can then be aligned with the exact center of the pivot point 103. This mechanism improves steering, reduces wear on moving parts and improves the overall functionality of the pumper arm 102. It also eliminates the need for a slotted steering swivel because there is little or no forward/backward movement of the steering arm 120. A direct connection between the steering arm 120 and the steering bar 110 can therefore be provided. More specifically, rather than the longitudinal slot 119 and swivel, the hole 119A for receiving the steering arm 120 in the steering bar 110 can be sized to more closely fit the steering arm 120 so that no significant longitudinal movement of the steering arm 120 within the hole 119A is permitted.

According to another embodiment, an improved braking system uses caliper brakes 420 to provide the stopping force for stopping the vehicle 400. A braking cable (not shown) for operating the caliper brakes 420 can run through the pumper arm 102 or can be arranged separately through the body along, or through, the frame 104A, for instance. In the previous embodiment, brakes were provided by a handle 170 connected to a wheel braking bar 172. The wheel braking bar 172 has ends arranged proximal to each of the rear wheels 116, 117. When the braking handle 170 is pulled, it applies pressure to each of the rear wheels 116, 117 through the ends of the braking bar 172 to slow the wheels 116, 117 using a friction force applied to an outside surface of the wheel 116, 117. The caliper braking system 420, on the other hand, uses a caliper 422 to apply a frictional force through brake pads 424 to sides of a wheel frame 118A.

Figure 6:
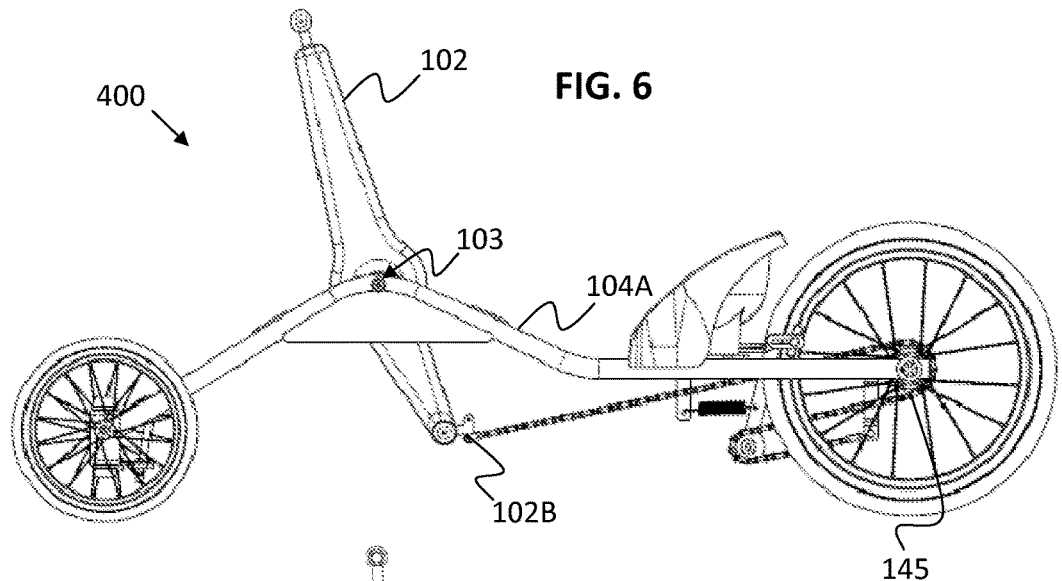
Figure 6A:
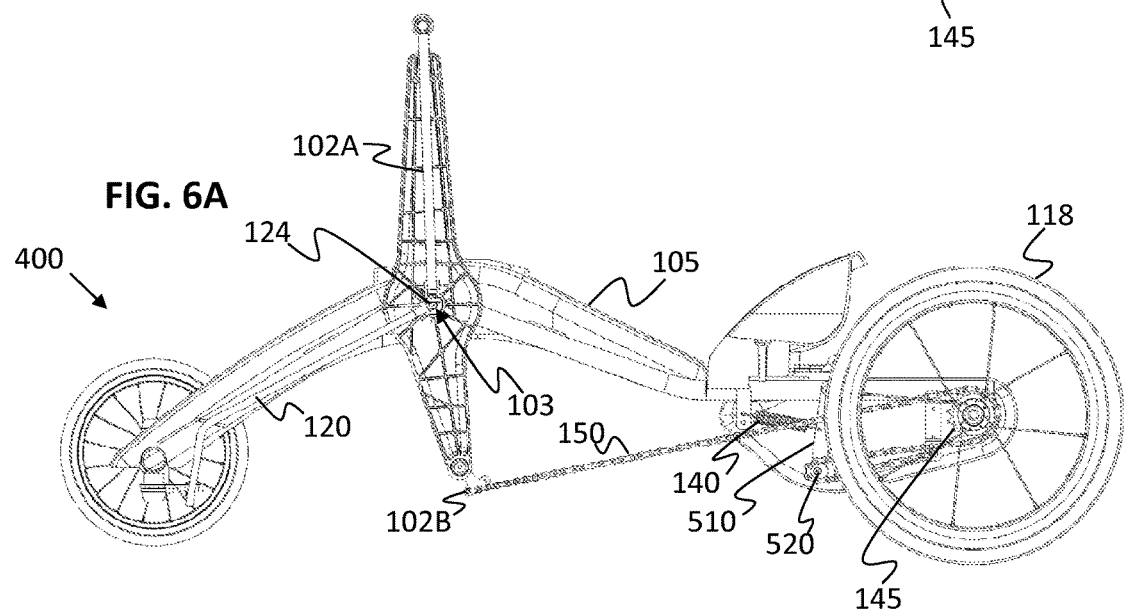
Figure 7:
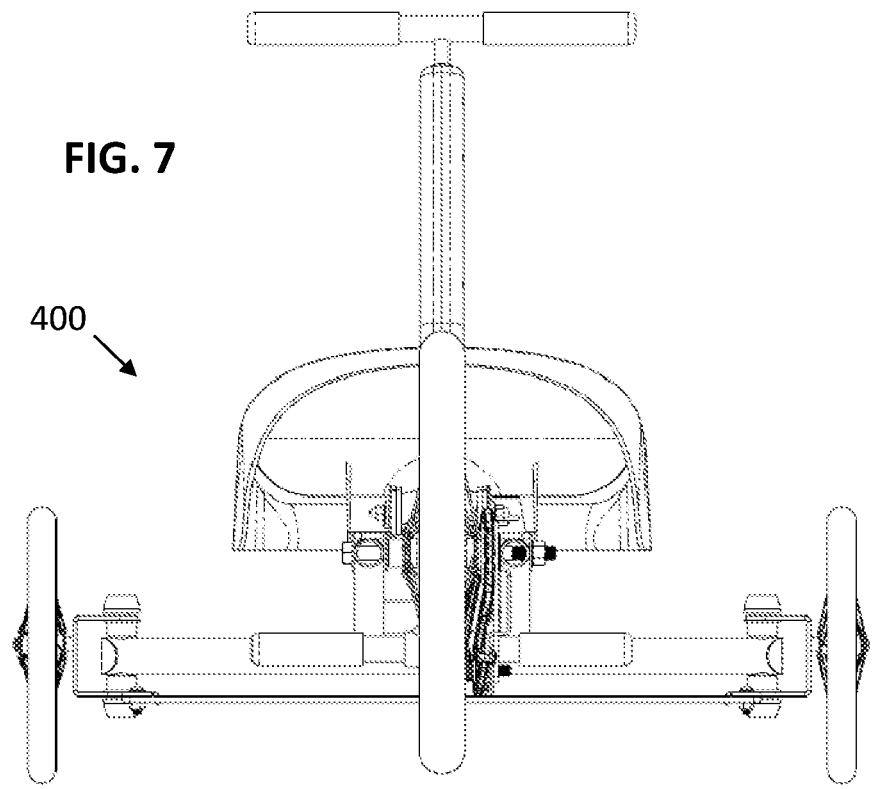
Figure 7A:
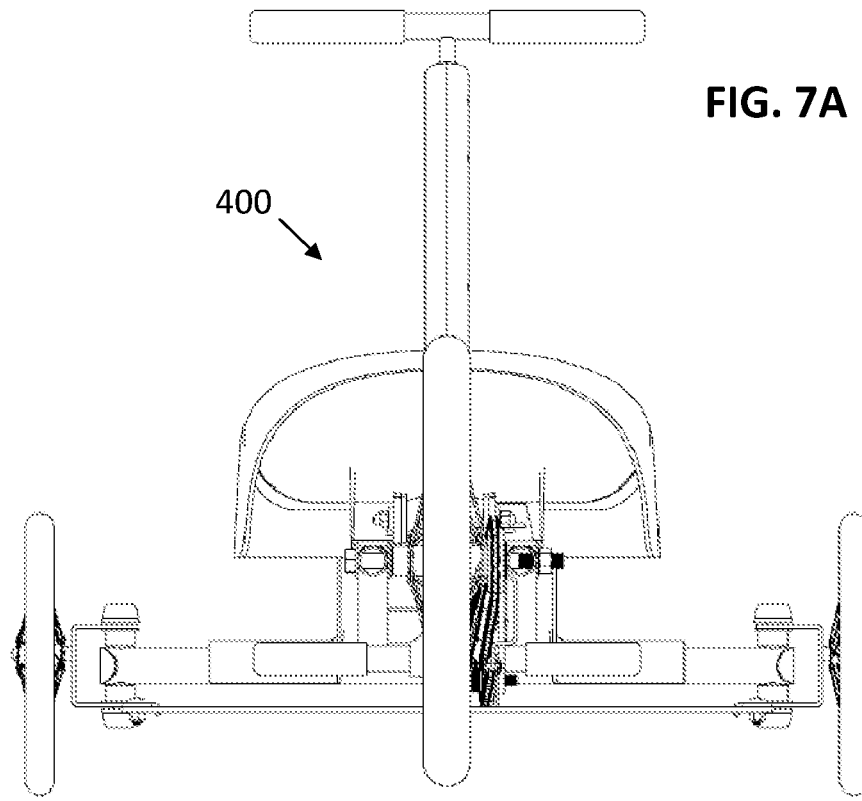
Figure 9:
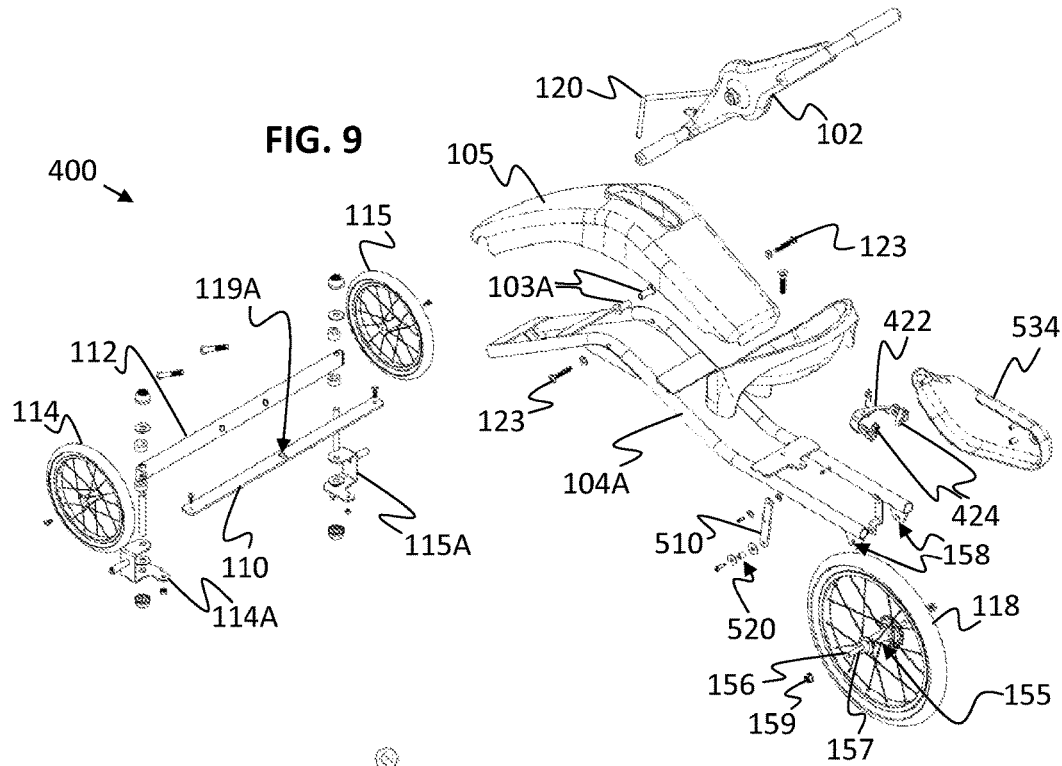
FIG. 9 is an exploded perspective view of the ride-along vehicle of FIG. 4A, further illustrating various components of the ride-along vehicle according to certain embodiments.
Figure 10:
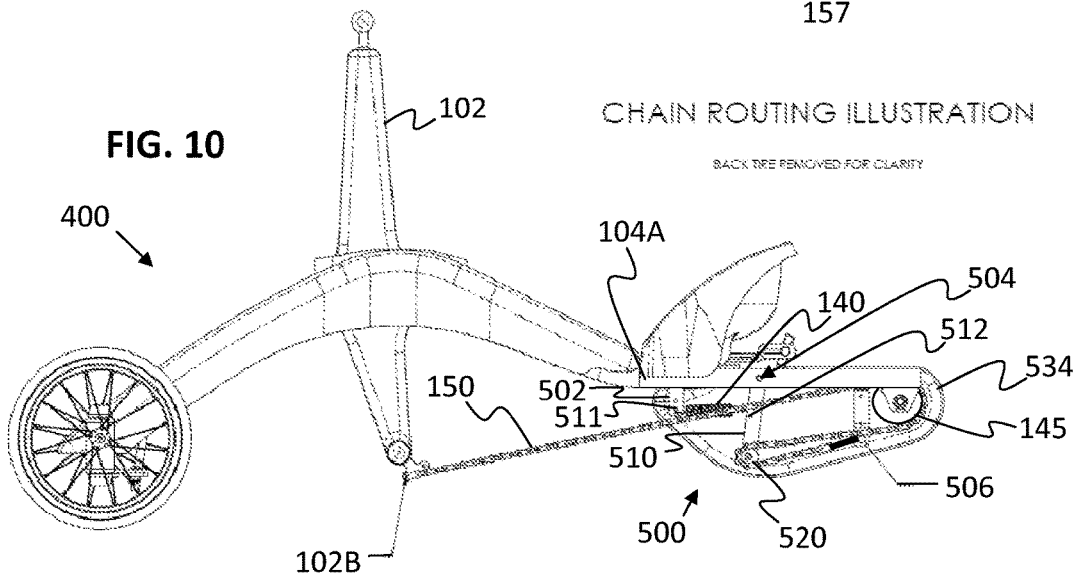
FIG. 10 is a somewhat schematic side view of the ride-along vehicle of FIG. 4A, having the rear wheel removed to more clearly illustrate a routing of the chain according to an embodiment of the inventive concepts.

FIG. 10 further illustrates an improved spring and chain assembly including a sprocket and chain routing system 500. Referring specifically to FIGS. 6A and 10, rather than connecting directly to an end of the chain 150, the spring 140 can be connected to a fulcrum 510 that has a chain retention pulley, gear, guide, or wheel 520 that keeps the chain 150 tight in loop. This improved spring/chain routing system 500 can improve the pump-action operation of the vehicle 400. A spring/chain guard 534 can further be provided to cover a majority of the spring and chain assembly 500, including the spring and chain connection area as well as the sprocket and chain connection area.

More specifically, the lever arm or fulcrum 510 could be connected to one end of the spring 140 at a connection point 512. The fulcrum can be configured to provide tension to the chain 150 to maintain tension on the chain 150 without a direct connection between the chain 150 and the spring 140. The other end of the spring 140 could be connected to the vehicle body 104A through a rigid connection structure 502 at a connection point 511.

The chain 150 could be routed around a wheel, chain guide, or gear 520 arranged on one end of the fulcrum 510, with the other end (or other portion) of the fulcrum 510 being pivotably connected to the body 104A at a pivot point 504 to permit the distal end of the fulcrum 510 having the chain guide 520 to move forward and back during operation of the pumper arm 102. One end of the chain 150 could be connected to a connection mechanism 102B on the bottom end of the pumper arm 102, with the chain 150 routed around the sprocket 145, around the chain guide 520, and an opposite end of the chain 150 rigidly connected to the vehicle body 104A near the sprocket, such as through a chain mount 506.

The spring 140 applies a force to the fulcrum 510 to keep the chain 150 continuously tight around the sprocket 145 during operation of the pumper arm 102. This design allows for a greater range of movement of the pumper arm 102 without the need for a longer spring 140. This design further permits a much more efficient movement of the vehicle 400 in response to the pumping action. In other words, this design allows a greater amount of chain 150 to cover the sprocket 145 while using a smaller spring 140.

The main benefits of this chain-routing design can therefore be obtained using the downwardly extending fulcrum 510 pivotably connected to the frame 104A at upper end of the fulcrum 510. The chain retention member (such as a pulley, wheel, or guide) 520 arranged on a lower (distal) end of the fulcrum 510 keeps the chain 150 aligned on the fulcrum 510 and aligned with the sprocket 145. The spring 140 is attached between the fulcrum 510 and the frame 104A (and can be attached to the frame directly or through rigid connector) to keep the chain 150 tight. In this design, therefore, the spring 140 is not directly attached to the chain 150. The chain 150 is instead attached at one end to an end of the pumper arm 102, and at another end to the frame 104A (either directly or through rigid connector). This design permits a greater amount of chain to be used with a smaller spring size, thus significantly increasing the possible stroke length (for example, providing about 104 inches in a single stroke). This increased stroke length permits significantly increased movement with less effort.

Various other improvements are also contemplated, and numerous variations to the specific designs identified above are possible without departing from the spirit and scope of the inventive concepts. Having described and illustrated principles of the present inventive concepts in various preferred embodiments thereof, it should be apparent that the invention can be modified in arrangement and detail without departing from such principles.

What is claimed is:

1. A pump-action ride-along vehicle comprising:
   a body providing a frame;
   a pumper arm pivotably connected to the frame at a pivot point;
   a steering arm having one end thereof connected to the pumper arm through a universal joint and having another end thereof connected to a steering mechanism arranged to control a direction of travel of the ride-along vehicle;
   a chain assembly connected to an end of the pumper arm, wherein the chain assembly comprises a chain connected to the pumper arm at one end of the chain and rigidly connected to the frame at an opposite end of the chain wherein the chain assembly further comprises a chain mount for rigidly connecting the chain to the frame, a fulcrum pivotably connected to the frame, a chain guide mounted on the fulcrum, and a spring biasing the fulcrum to provide tension to the chain;
   a sprocket arranged on an axle and engaging the chain, wherein said sprocket is configured to cause rotation of the axle in response to actuation of the pumper arm and corresponding movement of the chain; and
   one or more wheels arranged on the axle.

2. The ride-along vehicle of claim 1, wherein the steering mechanism comprises a steering bar connected between two front wheels of the pump-action ride-along vehicle.

3. The ride-along vehicle of claim 1, wherein the universal joint between the pumper arm and the steering arm is aligned with a center of the pivot point to eliminate forward and rearward movement of the steering arm with respect to the steering mechanism during a pumping action.

4. The ride-along vehicle of claim 3, wherein the steering mechanism comprises a steering bar having a hole therein configured to receive an end of the steering arm and to permit rotation of the steering arm within the hole but not to permit appreciable forward and rearward movement of the steering arm within the hole.

5. The ride-along vehicle of claim 1, further comprising a chain guard configured to cover a majority of the chain assembly.

6. The ride-along vehicle of claim 1, wherein the fulcrum is connected to the frame forward of the chain mount.

7. The ride-along vehicle of claim 5, wherein the fulcrum is connected to the frame forward of the chain mount.

8. The ride-along vehicle of claim 7, wherein a portion of the chain extends from the chain guard to connect to the pumper arm.

9. The ride-along vehicle of claim 8, wherein the spring is connected between the frame and the fulcrum, and wherein the spring is connected to the frame in front of the fulcrum to bias the fulcrum in a forward position.

10. The ride-along vehicle of claim 1, wherein said fulcrum is connected to one end of the spring, the other end of the spring being rigidly attached to the frame at a distance from the fulcrum that provides tension in the spring,
    wherein said chain guide is configured to engage the chain, such that the fulcrum maintains tension on the chain without a direct connection between the chain and the spring.

11. The ride-along vehicle of claim 10, wherein the end of the spring attached to the frame is attached to the frame in a position forward of the fulcrum.

12. The ride-along vehicle of claim 10, wherein the fulcrum is pivotably connected to the frame at an upper end thereof, and wherein the chain guide is arranged at a lower end of the fulcrum.

13. A ride-along vehicle comprising:
    a pump-action arm configured to provide movement to the vehicle when pumped;
    a spring and chain assembly connected to the pump-action arm at one end, said spring and chain assembly having a chain that engages a sprocket on an axle to provide rotational movement to the axle and a fulcrum pivotably connected to the frame and having a chain retention member arranged thereon; and
    wherein one end of the chain is connected to the pump-action arm and a second end of the chain is rigidly attached to a frame of the ride-along vehicle.

14. The ride-along vehicle according to claim 13, wherein a spring/chain guard covers substantially all of the spring and chain assembly.

15. The ride-along vehicle according to claim 14, wherein the fulcrum is connected to the frame forward of a chain mount for rigidly connecting the chain to the frame.

16. The ride-along vehicle according to claim 13, wherein the spring and chain assembly comprises a spring connected between the frame and the fulcrum to bias the fulcrum and provide tension to the chain.

17. A ride-along vehicle comprising:
    a frame;
    a pump arm pivotably connected to the frame at a pivot point;
    a chain connected to the frame and the pump arm;
    a fulcrum pivotably connected to the frame and having a chain retention member, and a spring connected between the fulcrum and the frame, wherein said fulcrum is configured to provide tension to the chain; and
    a steering arm connected to the pump arm through a universal joint, wherein the universal joint is aligned with a center of the pivot point.

18. The ride-along vehicle of claim 17, further comprising a steering bar connected between front wheels of the ride-along vehicle, wherein an end of the steering arm is arranged within a hole in the steering bar, and wherein the hole is sized to closely fit the steering arm so as not to permit any appreciable forward, backward, or lateral movement of the steering arm within the hole.

19. The ride-along vehicle of claim 17, wherein the fulcrum is connected to the frame forward of a chain mount connecting the chain to the frame.

20. The ride-along vehicle of claim 17, wherein the spring is connected to the frame forward of the fulcrum.

\* \* \* \* \*